United States Patent [19]

Koishi et al.

[11] Patent Number: 4,788,266

[45] Date of Patent: Nov. 29, 1988

[54] SOLUBLE AND CURABLE FLUORINE-CONTAINING COPOLYMER

[75] Inventors: Toshio Koishi, Sakado; Isao Tanaka, Kawagoe, both of Japan

[73] Assignee: Central Glass Company, Limited, Ube, Japan

[21] Appl. No.: 41,429

[22] Filed: Apr. 23, 1987

[30] Foreign Application Priority Data

Apr. 23, 1986 [JP] Japan .................................. 61-92335

[51] Int. Cl.$^4$ .......................................... C08F 214/18
[52] U.S. Cl. .................... 526/249; 526/332; 526/333
[58] Field of Search ......................... 526/249, 332, 333

[56] References Cited

U.S. PATENT DOCUMENTS

| | | | |
|---|---|---|---|
| 3,890,447 | 6/1975 | Shatney | 426/105 |
| 3,908,070 | 9/1975 | Marzolf | 525/221 |
| 4,385,164 | 5/1983 | Sinclair et al. | 525/242 |
| 4,631,326 | 12/1986 | Koishi et al. | 17/45 |

FOREIGN PATENT DOCUMENTS

| | | | |
|---|---|---|---|
| 0150725 | 8/1985 | European Pat. Off. | 526/249 |
| 57-34108 | 2/1982 | Japan . | |
| 888014 | 1/1962 | United Kingdom . | |
| 948998 | 2/1964 | United Kingdom . | |
| 2081727 | 2/1982 | United Kingdom . | |
| 2163756 | 3/1986 | United Kingdom . | |

OTHER PUBLICATIONS

"Kinetics of Chlorotrifluoroethylene Polymerization", by W. M. Thomas et al., *J. Polymer Science*, vol. 11, No. 5 (1953), pp. 455–470.

*Primary Examiner*—Joseph L. Schofer
*Assistant Examiner*—N. Sarofim
*Attorney, Agent, or Firm*—Fleit, Jacobson, Cohn & Price

[57] ABSTRACT

The invention relates to a novel fluorine-containing copolymer which comprises 25–75 mol % of chlorotrifluoroethylene, 10–70 mol % of a vinyl or isopropenyl ester of fatty acid and 3–40 mol % of allylglycidyl ether and may optionally comprise additional comonomer(s) such as an acrylate. This copolymer possesses favorable properties characteristic of fluororesins, is soluble in various organic solvents and is curable with a compound having a functional group that reacts with epoxy group. A coating liquid using this copolymer gives a hard, stable and transparent coating film on either metal surface or glass surface.

8 Claims, No Drawings

SOLUBLE AND CURABLE FLUORINE-CONTAINING COPOLYMER

BACKGROUND OF THE INVENTION

This invention relates to a novel copolymer of chlorotrifluoroethylene, a fatty acid ester and a glycidyl ether, which is soluble in various organic solvents and is curable.

Polymers of some fluorocompounds have provided synthetic resins which possess good mechanical properties and excellent heat resistance, chemical resistance and weather resistance. As one field of applications of fluororesins, employment thereof as paint vehicles has been developed with a view to utilizing their excellent chemical resistance and weather resistance for producing maintenance-free coating films. For example, polytetrafluoroethylene, polychlorotrifluoroethylene and vinylidene fluoride base copolymers have attracted interest as paint vehicles, and also it has been developed to modify a conventional synthetic resin base paint by the addition of a certain fluororesin. Paint or coating films containing a fluororesin are noteworthy in lubricating and nonadherent properties too.

In the early days of development fluororesin base paints were almost limited to powder paints and dispersions in water or organic liquid. In applications of these paints heating to a temperaure above the melting point of the employed fluororesin is an indispensable requisite for formation of a uniform paint film, so that a high temperature baking treatment which calls for skill has to be performed by experts. To expand practical applicabilities of fluororesin base paints, recently much attention has been directed to fluororesin base paints of the solvent-thinned type which do not require baking treatment for curing and which can easily be used on the site of mechanical manufacture or building work.

To obtain fluororesins that are soluble in practicable organic solvents and useful as vehicles in solvent-thinned paints, usually it is necessary to reduce crystallinity of fluorine-containing polymers by certain means such as copolymerization to thereby accomplish internal plastization. Furthermore, there are some other problems to be resolved in producing a practical paint by using a fluororesin which is rendered soluble. For instance, the problems will include how to retain a desirable degree of rigidity or shear modulus in the soluble fluororesin, how to control the molecular weight of the fluororesin with a view to desirably adjusting the viscosity of the paint and how to select and control the kind and amount of functional groups which must be introduced into the soluble fluororesin in order to obtain a paint that is curable, recoatable and resistant to chemicals. Cost of production also has to be taken into consideration. It is not easy to reach balanced solution for all of these problems. As soluble and curable fluororesins for use in paints, GB No. 2,081,727A shows copolymers of fluoroolefin, cyclohexyl vinyl ether, alkyl vinyl ether and hydroxyalkyl vinyl ether and JP-A 57-34108 copolymers of fluoroolefin, cyclohexyl vinyl ether and glycidyl vinyl ether.

It is reported in GB No. 888,014 and in J. Polymer Science, Vol. 11, No. 5 (1953), 455 that a copolymer of chlorotrifluoroethylene and a vinyl ester of fatty acid exhibits high transparency over a wide range of wavelength and possesses high tensile strength and excellent impact resistance and can relatively easily be dissolved in organic solvents by moderate heating. If a solution of this copolymer is used as a paint or coating composition it will be possible to obtain a coating film that is hard, transparent and glossy. However, this solution lacks recoatability since the copolymer is not curable.

GB No. 2,163,756A (and corresponding U.S. Pat. No. 4,631,326) shows a copolymer of chlorotrifluoroethylene, a vinyl or isopropenyl ester of fatty acid and a hydroxyl-containing allyl ether. This copolymer is soluble in various organic solvents and is curable at relatively low temperatures with a curing agent that reacts with active hydrogen. A solution of this copolymer serves as a paint or coating composition which provides a coating film excellent as a fluororesin film. Coating films formed of this copolymer exhibit good adhesion to metal surfaces, but some unsatisfaction remains in adhesion of the same coating films to glass surface.

SUMMARY OF THE INVENTION

It is an object of the present invention to provide a novel fluorine-containing copolymer which is soluble in various organic solvents and is easily curable by moderate heating in the presence of an ordinary curing agent and which is of use in solution form as a paint or coating liquid to form hard, stable and transparent coating films with strong adhesion to not only metal surfaces but also glass surfaces.

We have accomplished the above object fundamentally by discovering that adhesion of the coating films to glass surfaces can be remarkably improved by modifying the fluorine-containing copolymer according to GB No. 2,163,756A so as to-employ epoxy groups as the functional groups of the copolymer and by selecting allylglycidyl ether as a monomer having epoxy group. Our success was unexpected since allylglycidyl ether has been accepted as not liable to undergo radical copolymerization with monomers used for popular polymers.

More definitely, the present invention provides a curable copolymer comprising 25–75 mol % of first repeating units which originate from chlorotrifluoroethylen, 10–70 mol % of second repeating units which originate from a fatty acid ester represented by the general formula (1),

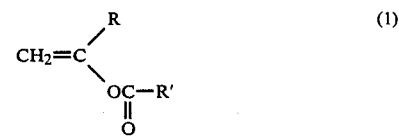

wherein R is hydrogen atom or methyl group and R' is an alkyl group having 1 to 12 carbon atoms, and 3–40 mol % of third repeating units which originate from allylglycidyl ether represented by the formula

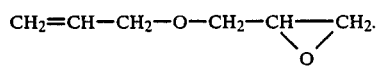

Optionally, a copolymer according to the invention may further comprise not more than 20 mol % of additional repeating units which originate from a monomer or monomers different from the above defined essential monomers.

The amounts of the essential three components of the copolymer are limited within the above specified ranges, respectively, in view of the following tendencies.

If the amount of chlorotrifluoroethylene is too large the copolymer becomes low in solubilities in organic solvents and, besides, it becomes difficult to prepare the copolymer with high yield. If the amount of this component is too small the copolymer become insufficient in chemical resistance and weather resistance. It is preferred that the repeating units originating from chlorotrifluoroethylene amounts to 40-60 mol %. The second monomer represented by the general formula (1) is a vinyl or isopropenyl ester of fatty acid. If the amount of this fatty acid ester is too large the copolymer becomes insufficient in chemical resistance and weather resistance. If the amount of this monomer is too small the copolymer will become low in molecular weight, and some difficulty will arise in preparing the copolymer. It is preferred that the repeating units originating from a vinyl or isopropenyl ester of fatty acid amounts to 20-50 mol %. If the amount of allylglycidyl ether is too large the copolymer will become low in molecular weight, and some difficulty will arise in preparing the copolymer. If the amount of the same component is too small the copolymer becomes low in its liability to curing reaction and, therefore, remains insufficient in chemical resistance, weather resistance and some mechanical properties, and a coating liquid composition using the copolymer becomes poor in recoatability. It is preferred that the allylglycidyl ether component amounts to 5-30 mol %. If the amount of the optional component exceeds 20 mol % the copolymer will become insufficient in solubilities, transparency, etc., and some difficulty will arise in preparing the copolymer. It is preferred that the amount of the optional component is not more than 10 mol %.

Where it is intended to use a copolymer according to the invention in a coating liquid composition, it is important to adjust the composition of the copolymer such that the intrinsic viscosity of the copolymer dissolved in tetrahydrofuran at 30° C. falls in the range from 0.05 to 2.0 dl/g, and preferably in the range from 0.1 to 0.5 dl/g. When the intrinsic viscosity is too high the solubilities of the copolymer in organic solvents are not desirably high. When the intrinsic viscosity is too low the coating liquid composition will be unsatisfactory in applicability and will fail to provide coating films having very good properties.

A copolymer according to the invention is excellent in chemical resistance and weather resistance since it has C-F bond in the molecular chain and exhibits good adhesion to steels, aluminum and its alloys and other metals and also to glasses primarily because of having ester bond and also because of containing allylglycidyl ether. Furthermore, this copolymer has epoxy groups as functional groups and accordingly can be firmly cured by reaction with a compound having a functional group that reacts with epoxy group, e.g. by reaction with hexamethylenediamine.

A copolymer according to the invention is soluble in various kinds of organic solvents. As an important use of the novel copolymer, a coating liquid composition is obtained by dissolving this copolymer in a suitable organic solvent together with a curing agent and any optional additive. Such a coating liquid composition provides a coating film which is hard, transparent and glossy and possesses the characteristic properties of the novel copolymer, and the coating liquid composition is applicable to various metals and glasses with very strong adhesion of the obtained coating film to the metal or glass surface. Also it is possible to apply the same coating liquid composition to other nonmetallic materials such as wood and concrete.

DESCRIPTION OF THE PREFERRED EMBODIMENTS

For fluorine-containing copolymers according to the invention chlorotrifluoroethylene is exclusively used as the fluorine-containing component. As the second component which must have ester bond, vinyl esters and isopropenyl esters of fatty acids are alternatively useful. Examples of fatty acid vinyl esters suited to this invention are vinyl acetate, vinyl lactate, vinyl butyrate, vinyl isobutyrate, vinyl caproate, vinyl isocaproate, vinyl pivalate, vinyl caprylate, vinyl caprylylate and vinyl caproylate. Examples of fatty acid isopropenyl esters suited to this invention are isopropenyl acetate and isopropenyl propionate. When using a fatty acid vinyl ester it is preferred to choose one in which the alkyl group, R' in the general formula (1), has 1 to 3 carbon atoms. When using a fatty acid isopropenyl ester it is preferable to choose isopropenyl acetate because of ease of preparing a desired copolymer.

The third component which provides functional groups to the fluorine-containing copolymer is always allylglycidyl ether.

Besides the above described essential components, another monomer or other monomers may optionally be incorporated into a copolymer according to the invention on condition that the optional comonomer(s) does not occupy more than 20 mol % of the copolymer. For example, an optional comonomer may be chosen from acrylates and methacrylates such as ethyl acrylate, ethyl methacrylate, methyl acrylate, methyl methacrylate, glycidyl acrylate and glycidyl methacrylate, acrylic amides such as acrylamide and N-methylol acrylamide and vinyl ethers such as ethylvinyl ether and butylvinyl ether.

As to purities of monomers for use in this invention, gas chromatography purity of 98% or above is sufficient so long as impurities obstructive to usual radical polymerization reactions are not contained.

A copolymer according to the invention is obtained by copolymerizing the essential three kinds of monomers, and the optional monomer(s) if used, in the presence of a commonly used radical polymerization initiator. The manner of the copolymerization reaction is not particularly limited. For example, the object is accomplished by solution polymerization emulsion polymerization suspension polymerization or bulk polymerization.

The copolymerization reaction can be carried out at temperatures ranging from about $-30°$ C. to about $100°$ C. Usually it is suitable to carry out the copolymerization reaction at a tmperature in the range from about $0°$ C. to about $70°$ C. A suitable radical polymerization initiator can be selected from oil-soluble radical polymerization initiators including organic peroxides such as diisopropyl peroxydicarbonate, di-n-propyl peroxydicarbonate, t-butyl peroxypivalate, di-2-ethylhexyl peroxydicarbonate, benzoyl peroxide, lauroyl peroxide and perfluorooctanoyl peroxide, azo compounds such as azoisobutyronitrile and azobis-2,4-dimethylvaleronitrile and certain organic boron compounds such as oxytriethylboron and peroxytriethylboron, and water-soluble radical polymerization initiators such as hydrogen peroxide, potassium persulfate, ammonium persulfate and redox-type initiators.

A suitable liquid medium for the copolymerization reaction is selected from water, hydrocarbons and organic fluorocompounds according to the manner of the reaction. If desired a mixture of two or three kinds of liquids ma be used. In the case of copolymerization reaction in an aqueous medium it is usual to use a conventional emulsifying or suspension stabilizing agent.

To prepare a coating liquid composition comprising a fluorine-containing copolymer according to the invention, a variety of organic solvents are of use. Examples are cyclie ethers such as tetrahydrofuran and dioxane, esters represented by ethyl acetate and butyl acetate, ketones such as acetone and methylethyl ketone, some nitrogen-containing solvents such as dimethylformamide and pyridine and some halogen-containing solvents such as 1,1,1,-trichloroethane and trichloroethylene. Dissolution of a copolymer according to the invention in any of these solvents gives a colorless and transparent solution.

When a suitable amine is added to a solution of the fluorine-containing copolymer and the solvent is dissipated after applying the solution to a desired surface, curing reaction of the copolymer with the amine takes place and proceeds even at room temperature. The rate of curing reaction can be enhanced by heating. Also it is possible to use an organic acid or its anhydride as a curing agent, though a relatively high temperature is needed for curing reaction using such a curing agent. Besides a curing agent, desired additives such as pigment, ultraviolet absorbing agent and dispersion stabilizing agent may be added to a solution of the fluorine-containing copolymer. Almost every additive used in conventional paint or coating liquid compositions exhibits good dispersibility in a solution of this copolymer.

The invention is further illustrated by the following nonlimitative examples.

EXAMPLE 1

Initially 25.8 g of vinyl acetate (VAc), 17.1 g of allylglycidyl ether (AGE), 200 g of butyl acetate (BuAc), 2.0 g of sodium borate and 0.5 g of lauroyl peroxide (LPO) were charged in a 500 ml stainless steel autoclave provided with electromagnetic stirrer, and replacement of the gas atmosphere in the autoclave by nitrogen gas was repeated three times. Then the gas was purged from the autoclave, and 57.8 g of chlorotrifluoroethylene (CTFE) was introduced into the autoclave so that the CTFE/VAc/AGE proportions were 52/32/16 by mol. The temperature in the autoclave was gradually raised up to 60° C., at which radical copolymerization reaction was carried out for 24 hr. After that unreacted CTFE was discharged from the autoclave. The reaction product was in the form of a thick solution. (The concentration of solid solute in this solution was found to be 20.7 wt %.) This solution was poured into n-hexane to precipitate a semitransparent copolymer, which weighed 57.8 g after washing and drying.

The intrinsic viscosity of the obtained copolymer in tetrahydrofuran was 0.23 dl/g at 30° C., and the epoxy equivalent of the copolymer was measured to be 748 g/equiv. by direct titration of α-epoxy group. Infrared absorption spectrum of the copolymer exhibited absorption peaks at 3050 cm$^{-1}$ (C-H of methylene group in the terminal epoxy ring) and at 1760 cm$^{-1}$(C=O) Thermal analysis of the copolymer by differential scanning calorimetry (DSC) and thermogravimetry (TG) revealed that the copolymer does not have a clear melting point. By TG, weight loss of the copolymer began at a temperature above 250° C.

A mixed solution was prepared by first dissolving 25 g of the CTFE/VAc/AGE copolymer in 25 g of BuAc and then adding 1.9 g of 50 wt % solution of hexamethylenediamine in BuAc. The resultant solution was spread on a chromate treated aluminum plate with a film applicator. After evaporating the solvent the coating film on the aluminum plate was cured by heating a 150° C. for 10 min. Representative properties of the cured coating film were as shown in Table 1 by results of generally employed evaluation tests.

TABLE 1

| Test Item | Evaluation |
| --- | --- |
| Gloss (60° specular gloss) | 158 |
| Pencil Hardness (max. hardness of pencil failed to give scratch) | 2H |
| Cross-cut Adhesion Test (no peel areas among 100 areas tested with cellophane tape) | 100/100 |

The same solution was applied to a number of pieces of glass plate and aluminum plate, and the coating films were cured by the aforementioned method. Resistance of the cured coating films to several kinds of liquid chemicals was tested by immersion for 30 days at room temperature. The results are shown in Table 2 wherein: the mark "A" means no change in appearance by visual observation, and "B" means occurrence of some peel. For comparison, coating films of a ternary copolymer of CTFE, VAc and ethylene glycol monoallyl ether (EGAE), i.e. a copolymer having hydroxyl group as functional group, cured with isocyanate were tested in the same manner. The results are contained in Table 2.

TABLE 2

| Liquid Chemical | Substrate | CTFE/VAc/AGE Copolymer of Example 1 | CTEF/VAc/EGAE Copolymer for Comparison |
| --- | --- | --- | --- |
| 5% hydrochloric acid solution | glass | A | B |
| 5% sodium hydroxide solution | ibid | A | B |
| 3% sodium chloride solution | ibid | A | B |
| toluene | aluminum | A | A |
| perchloroethylene | ibid | A | A |
| methylisobutyl ketone | ibid | A | A |

EXAMPLE 2

Initially 51.2 g of vinyl butyrate (VBu), 25.7 g of AGE, 580 ml of water, 0.2 g of methyl cellulose, 3.0 g of sodium borate and 0.75 g of LPO were charged in a 1.4-liter stainless steel autoclave provided with electromagnetic stirrer. Then nitrogen gas was introduced into and finally purged from the autoclave in the same manner as in Example 1. After that 97.7 g of CTFE was introduced into the autoclave so that the CTFE/VBu/AGE proportions were 55/30/15 by mol. The temperature in the autoclave was gradually raised, and copolymerization reaction was carried out at 60° C. for 24 hr. After that unreacted CTFE was discharged from the autoclave. The reaction product was in the form of a slurry. The solid component of the slurry was collected by filtration and was washed with water and dried to obtain 107 g of a semitransparent copolymer powder.

The intrinsic viscosity of the obtained copolymer in tetrahydrofuran was 0.35 dl/g at 30° C., and the epoxy equivalent of the copolymer was measured to be 970 g/equiv. Infrared absorption spectrum of the copolymer exhibited absorption peaks at 3050 cm$^{-1}$ (C-H of methylene group in the terminal epoxy ring) and at 1760 cm$^{-1}$ (C=O).

A mixed solution was prepared by first dissolving 25 g of the CTFE/VBu/AGE copolymer in 25 g of BuAc and then adding 1.5 g of 50 wt % solution of 2,4,6-tridimethylaminomethylphenol in BuAc. The resultant solution was applied to an aluminum plate to form a cured coating film by the same method as in Example 1. Pencil hardness of the cured coating film was B, and the result of the cross-cut adhesion test on the same coating film was 100/100. The same solution was applied to a glass plate, and the coating film was cured by the same method. Then the coated glass plate was kept immersed in water at room temperature for 60 days. The coating film passed this test without peeling from the glass surface in any area.

EXAMPLE 3

Initially 25.8 g of VAc, 12.2 g of AGE, 4.2 g of ethyl acrylate (EA), 200 g of BuAc, 2.0 g of sodium borate and 0.5 g of LPO were charged in the autoclave used in Example 1. Then nitrogen gas was introduced into and finally purged from the autoclave in the same manner as in Example 1. After that 68.7 g of CTFE was introduced into the autoclave so that the CTFE/VAc/AGE/EA proportions were 57/29/10/4 by mol, and copolymerization reaction was carried out at 60° C. for 24 hr. After that unreacted CTFE was discharged from the autoclave. The reaction product was in the form of a thick solution. (The concentration of solid solute in this solution was found to be 20.2 wt %.) This solution was poured into a large quantity of n-hexane to precipitate a semitransparent copolymer, which weighed 50 g after washing and drying.

The intrinsic viscosity of the obtained copolymer in tetrahydrofuran was 0.27 dl/g at 30 °C., and the epoxy equivalent of the copolymer was measured to be 1250 g/equiv. Infrared absorption spectrum of the copolymer exhibited absorption peaks at 3050 cm$^{-1}$ (C-H of methylene group in the terminal epoxy ring) and at 1730-1760 cm$^{-1}$ (C=O)

A mixed solution was prepared by first dissolving 25 of the CTFE/VAc/AGE/EA copolymer in 25 g of methylisobutyl ketone and then adding 1.2 g of 50 wt % solution of hexamethylenediamine in methylisobutyl ketone. The resultant solution was applied to an aluminum plate to form a cured coating film by the same method a in Example 1. Pencil hardness of the cured coating film was 2H, and the result of the cross-cut adhesion test on the same coating film was 100/100. The same solution was applied to a glass plate, and the coating film was cured by the same method. At room temperature the coated glass plate was kept immersed in water for 60 days, but the coating film did not peel from the glass surface in any area.

EXAMPLE 4

Initially 12.0 g of isopropenyl acetate (IPAc), 6.8 g of AGE, 80 g of BuAc, 0.8 g sodium borate and 0.2 g of LPO were charged in a 200 ml stainless steel autoclave provided with electromagnetic stirrer. Then nitrogen gas was introduced into and finally purged from the autoclave in the same manner as in Example 1. After that 23.1 g of CTFE was introduced into the autoclave so that the CTFE/IPAc/AGE proportions were 52/32/16 by mol. The temperature in the autoclave was gradually raised, and copolymerization reaction was carried out at 60° C. for 24 hr. After that unreacted CTFE was discharged from the autoclave. The reaction product was in the form of solution. (The concentration of solid solute in this solution was found to be 10.7 wt %.) This solution was poured into a large quantity of n-hexane to precipitate a semitransparent copolymer, which weighed 13 g after washing and drying. The intrinsic viscosity of the obtained copolymer in tetrahydro furan was 0.12 dl/g at 30° C., and the epoxy equivalent of the copolymer was measured to be 1100 g/equiv. Infrared absorption spectrum of the copolymer exhibited absorption peaks at 3050 $^{-1}$ cm and at 1760 cm$^{-1}$.

A mixed solution was prepared by first dissolving 10 of the CTFE/IPAc/AGE copolymer in 10 g of methylisobutyl ketone and then adding 0.5 g of 50 wt % solution of hexamethylenediamine in methylisobutyl ketone. The resultant solution was applied to an aluminum plate to form a cured coating film by the same method as in Example 1. Pencil hardness of the cured coating film was 2H, and the result of the cross-cut adhesion test on the same coating film was 100/100. The same solution was applied to a glass plate, and the coating film was cured by the same method. At room temperature the coated glass plate was kept immersed in water for 60 days, but the coating film did not peel from the glass surface in any area.

What is claimed is:

1. A curable copolymer comprising:
   25 to 75 mol % of first repeating units which originate from chlorotrifluoroethylene;
   10 to 70 mol % of second repeating units which originate from a fatty acid ester represented by the general formula (1),

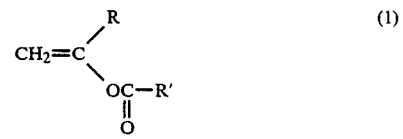

wherein R is hydrogen atom or methyl group and R' is an alkyl group having 1 to 12 carbon atoms; and
   3 to 40 mol % of third repeating units which originate from allylglycidyl ether represented by the formula

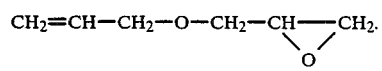

2. A copolymer according to claim 1, further comprising not more than 20 mol % of optional repeating units which originate from at least one monomer selected from the group consisting of acrylates, methacrylates, acrylic amides and vinyl ethers.

3. A copolymer according to claim 2, wherein the amount of said optional repeating units is not more than 10 mol %.

4. A copolymer according to claim 1, wherein said first, second and third repeating units amount to 40-60 mol %, 20-50 mol % and 5-30 mol %, respectively.

5. A copolymer according to claim 1, wherein said fatty acid ester is a fatty acid vinyl ester selected from the group consisting of vinyl acetate, vinyl lactate, vinyl butyrate, vinyl isobutyrate, vinyl caproate, vinyl isocaproate, vinyl pivalate, vinyl caprylate, vinyl caprylylate and vinyl caproylate.

6. A copolymer according to claim 1, wherein said fatty acid ester is a fatty acid isopropenyl ester selected from the group consisting of isopropenyl acetate and isopropenyl propionate.

7. A copolymer according to claim 1, wherein the proportions of said first, second and third repeating units ar such that the intrinsic viscosity of the copolymer dissolved in tetrahydrofuran is in the range from 0.05 to 2.0 dl/g at 30° C.

8. A copolymer according to claim 7, wherein said intrinsic viscosity is in the range from 0.1 to 0.5 dl/g.

* * * * *